Sept. 17, 1963 J. J. OVER, JR., ET AL 3,104,323

LIGHT SENSITIVE TWO STATE SWITCHING CIRCUIT

Filed Oct. 30, 1961

INVENTORS
JOHN J. OVER, JR.
CARL F. VAN SHURA

BY Richard O. Reed
John E. Kidd
ATTORNEY

United States Patent Office 3,104,323

Patented Sept. 17, 1963

3,104,323

LIGHT SENSITIVE TWO STATE SWITCHING CIRCUIT

John J. Over, Jr., Oxon Hill, Md., and Carl F. Van Shura, Washington, D.C., assignors to the United States of America as represented by the Secretary of the Navy Filed Oct. 30, 1961, Ser. No. 148,777

9 Claims. (Cl. 250—214)

(Granted under Title 35, U.S. Code (1952), sec. 266)

The invention described herein may be manufactured and used by or for the Government of the United States of America for governmental purposes without the payment of any royalties thereon or therefor.

This invention relates to an electronic switching circuit and more particularly to a controlled two state switching circuit actuated by a light-sensitive semiconductor capable of operating under the conditions imposed by an orbiting satellite.

Light-sensitive circuits have been employed in the past for performing various switching operations however their application became limited when extended to the field of satellite and space techniques. A serious drawback of previous light-sensitive circuits have been their inability to cope with the extreme range of temperature variations and rigid performance requirements, normally experienced in space operations. Due to the extreme precision required under these circumstances, ultrafast response and fast switching speed becomes essential. Further, under present conditions, size, weight and complexity of a circuit must be kept to a minimum. In the past many of the available, light-sensitive circuits required optical systems for accurate performance or employed photo-cells which require a time constant circuit in order to alleviate their inherent slow recovery time.

The purpose of this light-sensitive control switch is to convert the satellite spin rate, spin direction, spin axis, solar aspect angle and the earth aspect angle into a binary weighted electrical signal which is capable of being transmitted to earth. The signal may then be processed into useful data proportional to the aforesaid quantities of the satellite.

Accordingly, it is an object of this invention to provide an electronic bistable switch capable of operating under the conditions imposed by satellite and space technology.

It is another object of this invention to provide a two state electronic switch capable of extremely fast response exhibiting the characteristics of a double pole single throw switch, with the added advantage of instantaneous switching.

Another object of this invention is to provide a switch capable of instant change without an intermediate transient state and yet having an adjustable level of light intensity that is required to activate the switch.

Still another object of our invention is to provide a light-sensitive, instantaneous switch that is stable with temperature variations, requiring a minimum of power consumption and a circuit that eleminates any ambiguous output signal shift by requiring a predetermined light intensity level to be initially reached.

Yet another object of our invention is to provide an electronic bistable switch of relatively simple design and size, requiring only one polarity of signals for operation and capable of achieving extreme sensitivity with a switching point below 15 microamperes while at the same time retaining the capability of adjusting the sensitivity level.

With these and other objects in view, as will hereinafter more fully appear, and which will be more particularly pointed out in the appended claims, reference is now made to the following description taken in connection with the accompanying drawings in which:

This invention is a controlled electronic switch of extremely fast response using as controlling elements, the current output from a light-sensitive semiconductor and the signal sensing characteristic of a zener diode. The current output level from the light-sensitive semiconductor is a function of the incident light level with the threshold point for switching purposes a variable so that the incident light intensity necessary to activate the switch can be adjusted while the need for a negative power supply is eliminated by employing a diode with zener characteristics as a level sensing element.

Figure 1:
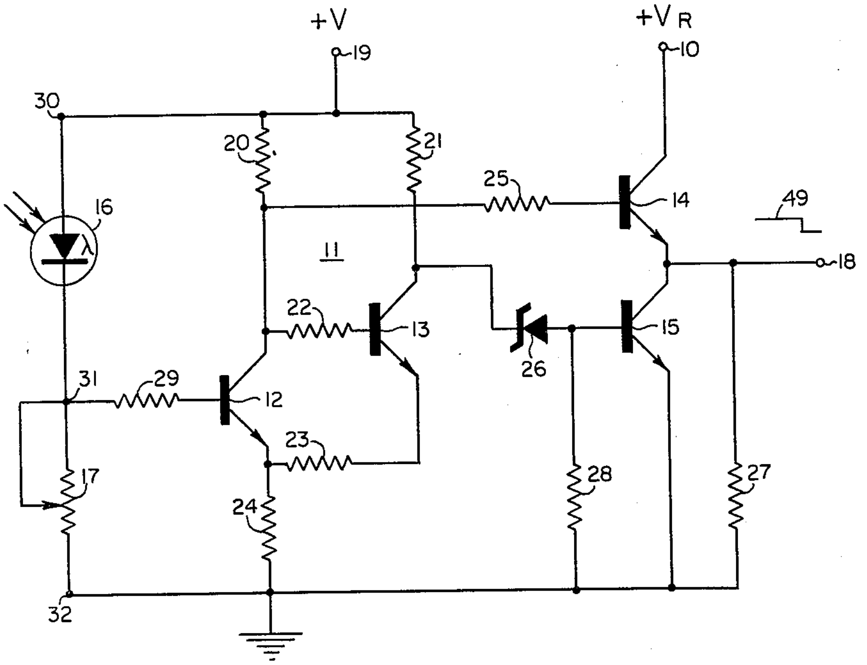
FIGURE 1 shows a schematic circuit diagram of one embodiment of a variable light-sensitive two state switch.

Referring now to the drawings and in particular to FIG. 1, a complete switching circuit is shown for controling a steady state voltage applied to terminal 10. The control of this voltage is provided by a regenerative type circuit 11 comprising a pair of like transistors 12 and 13 interconnected in what may be generally referred to as a Schmitt type trigger circuit and including a pair of similar transistors 14 and 15 which are employed to represent the two states of stability (On-Off) of the switching action performed on the steady state voltage impressed on terminal 10.

A photo-diode 16 which is placed so as to be exposed to light is serially connected to a variable resistor 17 which together gate the regenerative circuit 11 which in turn control transistors 14 and 15 so as to regulate the voltage impressed on terminal 10. The signal developed at output terminal 18 is generally shown at 49 wherein the sharpness of the leading and trailing edges is of prime importance. Biasing regenerative circuit 11 is a supply voltage applied to terminal 19 which is applied to the collectors of transistors 12 and 13 by resistors 20 and 21 connected in parallel to terminal 19. The collector of transistor 12 is coupled to the base of transistor 13 by resistor 22 while the emitter of transistor 13 is coupled back to the emitter of transistor 12 through resistor 23. Resistor 24 then couples both emitters to ground while forming a voltage divider with resistor 23. The collector of transistor 12 is also coupled to transistor 14 through resistor 25 biasing it on which the collector of transistor 13 is coupled to the base of transistor 15 through zener diode 26. The circuit is so designed that diode 26 inhibits transistor 15 from conducting thereby allowing the steady state voltage impressed on terminal 10 to be available across output load 27 at terminal 18. Resistor 28 couples the base of transistor 15 to ground.

The operation of the switching circuit may be examined by assuming that a steady state voltage is being applied to terminal 10 which is approximately one-half the value of the supply voltage and that the input sensitivity of the circuit has been adjusted or set by variable resistor 17 so that the photo-diode is in a region of dark (high) resistance with very little current flow through current limiting resistor 29. Even though light may be concentrated on photo-diode 16, high resistance and low current will prevail so long as the level set by resistance 17 is not reached. Initially in this state transistor 12 is biased into an "Off" state while transistor 13 is biased into its active but unsaturated state since each emitter has a resistive path to ground. Also under this initial condition, transistor 14 is in its saturated state and biased "On" and since its base voltage is greater than the steady state voltage on its collector, the emitter voltage is equal to the voltage impressed on the collector. Finally transistor 15 is biased "Off" by zener diode 26 which is used as a level sensing device. The zener diode characteristic is so chosen that the voltage available at the collector of transistor 13 when it is "On" (active region) but not in the saturation state will be below the breakdown voltage and hence zener diode 26 is at cut-off thereby cutting off transistor 15. Also by employing a zener diode such as 26, the need for a negative supply voltage for accomplishing the switching action of the circuit is eliminated. Since the emitter voltage of transistor 14 is equal to its collector voltage, an output pulse representative of the amplitude of the regulated voltage is developed across load 27, such as shown by waveform 49. The impedance of photo-diode 16 decreases as the intensity of the light source increases and when the current from the photo-diode reaches the threshold value set by variable reistor 17, the voltage drop across resistor 29 biases the base of transistor 12 "On" or into the conduction but non-saturated state. When transistor 12 is gated On, the collector voltage drops toward its emitter voltage which causes the base of transistor 13 to decrease in potential, driving transistor 13 to cutoff and into an "Off" state. Due to transistor 12 being "On," the current through resistor 25 is decreased sufficiently to cutoff transistor 14 and switching it to the "Off" state.

When transistor 13 is switched to its "Off" position, its collector voltage raises towards the supply voltage and zener diode 26 sensing the rise in voltage begins to conduct at its breakdown voltage, driving transistor 15 into its "On" state. This causes whatever voltage that may exist at terminal 18 to be immediately grounded causing the instantaneous loss of the regulated signal at this terminal 18. The instant that the light intensity falling on photo-diode 16 drops below the threshold value determined by variable resistor 17, the circuit will switch back to its original state.

The position of the light-sensitive diode 16 and variable resistor 17 may be interchanged thereby causing the regulated voltage at terminal 10 to be initially grounded when insufficient light falls on diode 16. When the intensity of the light falling on diode 16 is sufficient to trigger transistor 12, the regulated voltage that is impressed on terminal 10 then appears at output terminal 18, the reverse action of what is presently shown in FIG. 1.

It should be appreciated that because of the instantaneous grounding of the circuit at the moment the circuit is switched from one state to the other, a switch that operates in either full "Off" or full "On" is provided.

The actual design method is determined by the circuit characteristics desired. However, a convenient design procedure is provided by starting with 2N119 npn transistors and employing the following values:

| | |
|---|---|
| $R29=22K$ | $R25=100K$ |
| $R20=51K$ | $R27=68K$ |
| $R21=9.1K$ | $R28=51K$ |
| $R22=100K$ | $D16=IN2175$ |
| $R23=3K$ | $D26=IN756A$ |
| $R24=2K$ | |

The circuit shown provides an output voltage of either zero (0) or five (5) volts with a rise time of approximately 2 μseconds. The maximum operating rate is about 50 kc. The circuit switching between "On" and "Off" is so complete with this invention that when the probe of a D.C. digital voltmeter capable of reading a sensitivity of one millivolt is attached to the collector of transistor 15, no voltage at that point is recorded.

Figure 2:
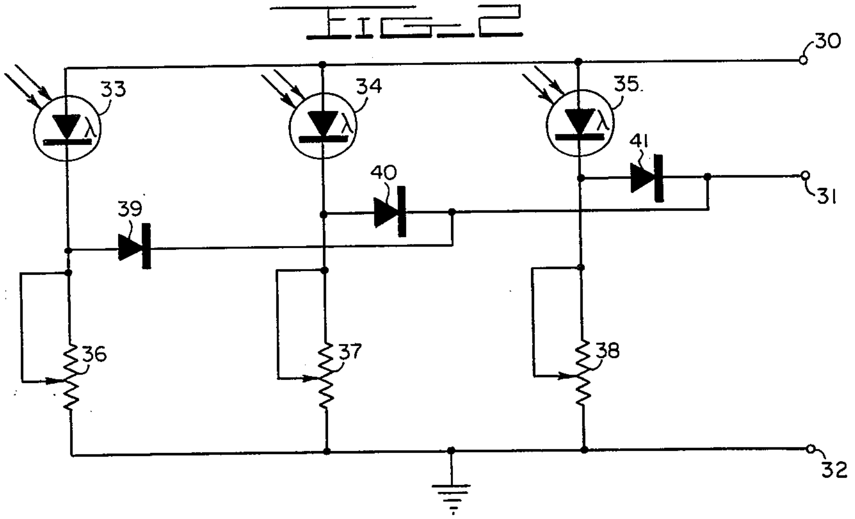
FIGURE 2 is a partial schematic circuit of an OR circuit which is employed in combination with the system of FIGURE 1.

In the above described operation, it has been assumed that only one light source was being used to control the switch circuit shown in FIG. 1, however, in actual operation it often becomes necessary to measure several sources of light. This is especially true in regard to a satellite that is monitoring its position in relation to the sun. In this instance, a group of light-sensing elements may be used as shown in FIG. 2, wherein an OR type light-sensitive logic circuit is shown. Here, each photo-diode 33, 34 and 35 in serially connected to variable resistors 36, 37 and 38 in the same manner as photo-diode 16 and resistor 17 in FIG. 1. In order to isolate the photo-diodes, one from the other, diodes 39, 40 and 41 are used between photo-diodes 33, 34 and 35 respectively and coupling resistor 29. It should be appreciated that in order to couple the circuit shown in FIG. 2 to the circuit shown in FIG. 1 it would be necessary to insert a properly biased rectifying device between photo-diode 16 and junction 31. By setting each variable resistor 36, 37 and 38 at a different threshold level, a very effective light sensitive indicator over a wide range becomes possible.

This circuit can be utilized to perform almost any switching functions desired by following the output stages with additional amplifier means for increasing the gain. It should also be appreciated that while only photo-diodes have been shown and while they appear more desirable because of their highly sensitive light intensity ability and their fast response time in response thereto, other devices whose current output is proportional to a parameter being observed can be used to drive the switch.

Obviously many modifications and variations of the present invention are possible in the light of the above teachings. It is therefore to be understood, that within the scope of the appended claims, the invention may be practiced otherwise than as specifically described.

What is claimed is:

1. In a controlled electronic switching circuit, the combination of, a parameter-sensitive semiconductor serially connected to a threshold determining means, a regenerative circuit comprising first and second transistors connected in opposite conduction states, each having collector, base and emitter junctions, both emitters having a common resistive path to ground, power supply means coupled to each collector, a current limiting resistor coupling the base of said first transistor to a junction point between said semiconductor and said threshold determining means, third and fourth transistors serially connected together, with each transistor representing an extreme state of the electronic switch, each having collector, base and emitter junctions, a regulated voltage impressed upon the collector of said third transistor while the base of said transistor is coupled to the collector of said first transistor, voltage level sensing means coupling the base of said fourth transistor to the collector of said second transistor and an output load coupled between the collector and emitter of said fourth transistor.

2. In the switching circuit as set forth in claim 1 wherein said parameter-sensitive semiconductor is a light-sensitive photo-diode while said threshold determining means is a variable resistor.

3. In the switching circuit as set forth in claim 2 wherein said level sensing device is a diode having zener characteristics.

4. In a light-sensitive instantaneous fast response switching circuit requiring a minimum of power consumption, the combination of, first and second solid-state electronic devices coupled together in a regenerative trigger circuit, a power supply coupled to the trigger circuit, said first electronic device being biased in a non-conducting state while said second electronic device is biased in a conducting but unsaturated state, a resistive path coupling both electronic, device to ground, light-sensitive semiconductor means serially connected to a variable threshold determining means, said serially connected means coupled to said regenerative trigger circuit so as to cause said first transistor to enter the saturation state and said second transistor to become non-conducting whenever the light-sensitive means reaches a current value larger than the value determined by said threshold means, third and fourth solid state electronic devices for representing the two extreme states of the switching circuit coupled to said regenerative trigger circuit, a regulated signal, said signal serially connected to said third solid state electronic device which is in turn connected to said fourth solid state electronic device, and an output load coupled between ground and a junction between said third and fourth solid state devices.

5. In the switching circuit as set forth in claim 4, including a voltage level sensing semiconductor exhibiting zener characteristics for coupling said fourth solid state electronic device to said regenerative trigger circuit.

6. An electronic switch having an adjustable switching threshold level and instantaneous switching response comprising light level sensitive adjustable switching means, regenerative trigger circuit means, current limiting means coupling said light level sensitive adjustable switching means to said regenerative trigger circuit means, a resistive path coupling said regenerative circuit to ground, a regulated signal source, switch means representing the two extreme states of the electronic switch coupled to said regenerative trigger circuit means, said switch means serially coupled to said regulated signal source, a voltage level sensing device coupled between said regenerative trigger circuit and said switch means, and an output load coupled between ground and said switch means.

7. In the electronic switch as set forth in claim 6 wherein said light-sensitive adjustable switching level means comprises a serially coupled photo-diode and variable resistor, said variable resistor being connected to ground.

8. In the electronic switch as set forth in claim 6 wherein said regenerative trigger circuit comprises first and second transistors wherein said first transistor is coupled to the light sensitive adjustable switching level means and each transistor is connected to ground through a common resistive path.

9. In the electronic switch as set forth in claim 6 wherein said switch means comprising two transistors serially connected together and said level sensing device is a zener diode.

References Cited in the file of this patent

UNITED STATES PATENTS

| | | |
|---|---|---|
| 2,890,353 | Van Overbeek et al. | June 9, 1919 |
| 2,964,655 | Mann | Dec. 13, 1960 |
| 3,056,891 | Kabell | Oct. 2, 1962 |